Figure 1:
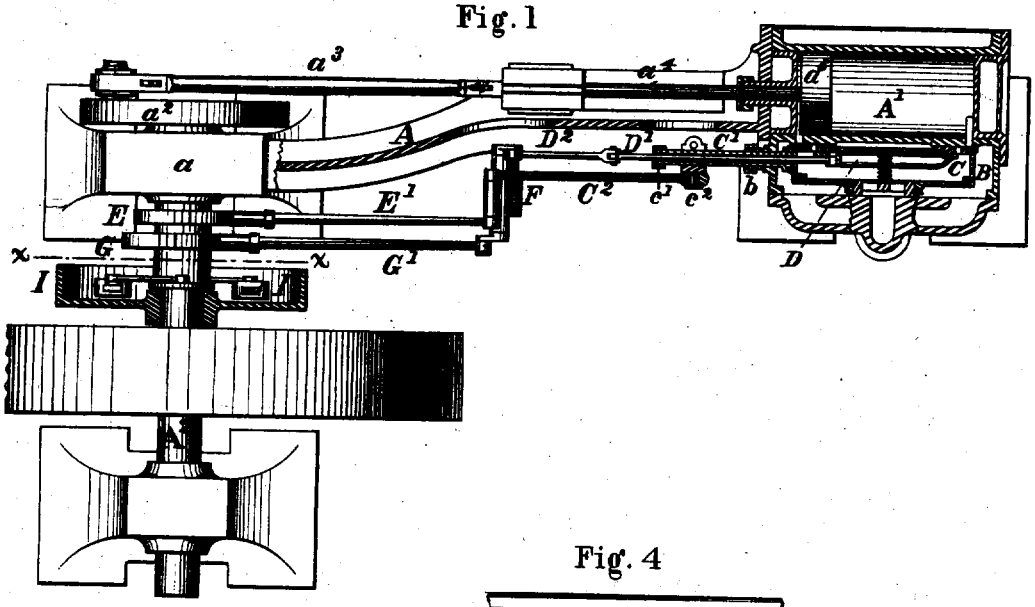

J. W. THOMPSON.

Assignor to himself and BUCKEYE ENGINE Co.

Valve-Gear for Steam-Engine.

No. 8,432. Reissued Sept. 24, 1878.

Witnesses.

Geo. A. Vaillant.

Wm. E. Morgan.

Inventor.

Jos. W. Thompson, by Jos. Thornton Bell, atty.

N. PETERS, PHOTO-LITHOGRAPHER, WASHINGTON, D. C.

UNITED STATES PATENT OFFICE.

JOSEPH W. THOMPSON, OF SALEM, OHIO, ASSIGNOR TO HIMSELF AND BUCKEYE ENGINE COMPANY.

IMPROVEMENT IN VALVE-GEARS FOR STEAM-ENGINES.

Specification forming part of Letters Patent No. 162,715, dated April 27, 1875; Reissue No. 8,432, dated September 24, 1878; application filed September 14, 1878.

DIVISION A.

*To all whom it may concern:*

Be it known that I, JOSEPH W. THOMPSON, of Salem, in the county of Columbiana and State of Ohio, have invented certain new and useful Improvements in Valve-Gearing for Steam-Engines, of which the following is a specification:

My invention relates to engines of the class known as "automatic cut-off engines," in which the movements of either an induction or a cut-off valve are so modified and controlled by a governor as that said valve is caused, by reason of its connection with the governor, to cut off steam by closing a cylinder-supply port earlier or later in the stroke, as may be required, to maintain uniformity of speed under variations of load and steam-pressure. Engines of this description are so classified in contradistinction to "throttling" or "wire-drawing" engines, in which the induction and cut-off valves have no connection with the governor, the regulating function of which is performed by varying the supply of steam to said valves by throttling—*i. e.*, increasing or diminishing the area of opening of a separate governor-valve controlling the passage of steam to the induction or cut-off valve or valves.

The object of my invention is to provide, in an automatic cut-off engine having separate main and cut-off valves, simple and effective means for independently actuating said valves in such manner that while the functions of admission and exhaust are performed by a main valve having a fixed and invariable travel, that of cut-off will be separately and independently effected by a cut-off valve, the position of which relatively to the main valve is varied and controlled by a governor, coincidently with and proportionately to variations of pressure or resistance, such variations of the position of the cut-off valve being made without affecting or impairing the normal relation of the extent and duration of its travel, for any stroke of the piston, to that of the main valve.

To this end my improvements consist in the combination of a balanced main valve, operated by a fixed eccentric; a separate cut-off valve, operated by an adjustable eccentric, which is varied angularly about its shaft by a centrifugal governor located thereon; a rocker-arm, pivoted at one of its ends upon or in a stationary bearing, and connected at the other to the valve and eccentric rods of the main valve; and a double-armed rock-shaft, which is journaled in the rocker-arm of the main valve between its fulcrum and vibrating ends, and which has its arms connected respectively with the valve-rod and the eccentric-rod of the cut-off valve, all as hereinafter more fully set forth.

Figure 3:
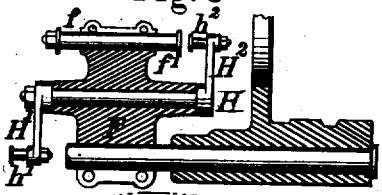
Figure 4:
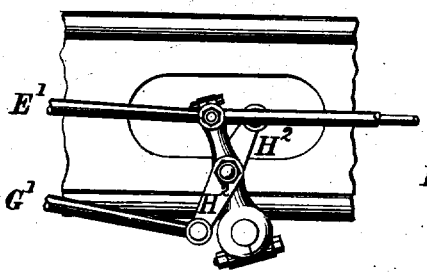
Figure 5:
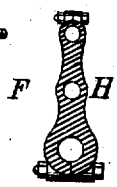
Figure 2:
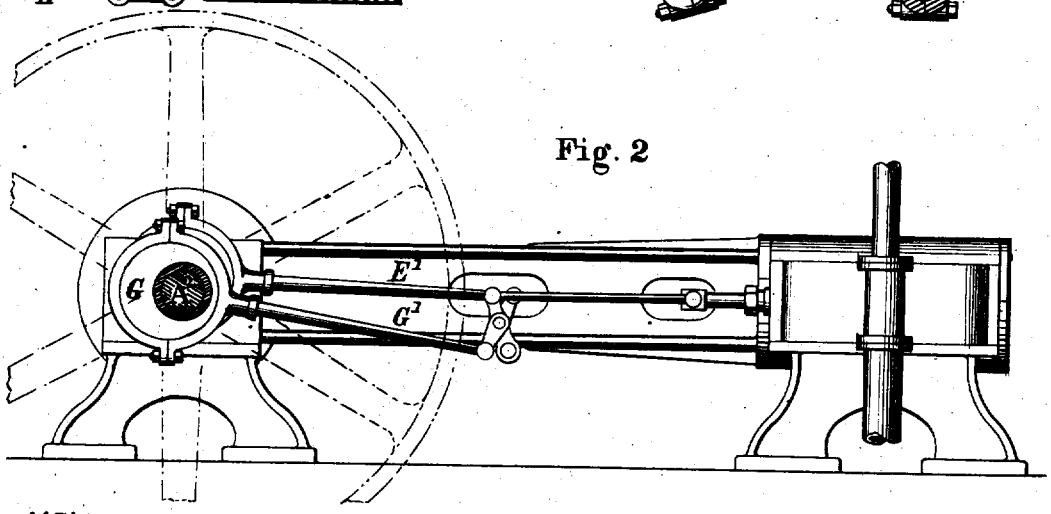

In the accompanying drawings, Figure 1 is a plan or top view, partly in section, of an automatic cut-off engine embodying my improvements; Fig. 2, a side view, in elevation, of the same; Fig. 3, a vertical central section, on an enlarged scale, through the main and cut-off rockers; Fig. 4, a side view, in elevation; and Fig. 5, a vertical section, at right angles to Fig. 3, of the same.

My improvements are herein shown and described as applied to a horizontal reciprocating engine, which is otherwise of the ordinary approved style of construction, having a frame or bed plate, A, interposed between and connected at its ends to the cylinder $A^1$ and one of the main bearings *a*. The main or driving shaft $A^2$ is supported in the bearings *a*, and rotated through a crank, $a^2$, connecting-rod $a^3$, piston-rod $a^4$, and piston $a^5$, in the usual manner. Ports or passages $a^1$ are formed in the cylinder $A^1$, adjacent to its ends, communicating with the valve-chest B, within which moves the main or distribution valve C, which is a case or chest, having ports *c* formed in its face, adjacent to the cylinder, over which ports the separate cut-off valve D slides.

The specific construction of the main and cut-off valves and their relation to the valve-chest B, in which they operate, need not be here particularly described, as the same do not, *per se*, constitute the subject-matter of this application, and are, moreover, fully set forth in a separate application, filed simultaneously herewith, and marked "Division C."

Motion is communicated to the main valve

C from an eccentric, E, firmly secured upon the driving-shaft $A^2$. The rod E′ of the eccentric E is connected to a pin, *f*, on the free end of a rocker, F, the opposite end of which is journaled in a bearing on the bed-plate A, about midway between the driving-shaft and cylinder. A tubular valve-rod, $C^1$, is secured to the main valve C, and, passing through a suitable gland or stuffing-box, *b*, in the valve-chest B, has a pin, $c^2$, secured upon it near its outer end, which pin is coupled by a rod or link, $C^2$, to a pin, *f′*, on the upper end of the rocker F, in line with the pin *f* of the eccentric-rod E′. The rocker-pins *f* and *f′* are substantially in a plane passing through the center of the driving-shaft and cylinder.

The cut-off valve D derives its motion from an eccentric, G, which is mounted loosely upon the driving-shaft $A^2$, and is varied in position angularly, and without lateral movement about the center thereof, in correspondence with variations of pressure or resistance, by a centrifugal governor mounted on said shaft, with which it is connected. In this instance the governor consists of a case or disk, I, secured upon the driving-shaft, and carrying weights fixed upon pivoted arms, coupled by links or rods to the eccentric G, and its construction and operation are fully set forth in an application filed simultaneously herewith, and marked "Division B;" but I do not here confine myself to the use of such specific device, as any other approved regulator located upon the shaft may be employed for varying the position of the cut-off eccentric without departing from the spirit of my invention. Moreover, a gear-wheel fitted loosely upon the driving-shaft, and connected so as to be varied in position by a governor thereon in a similar manner, and driving another wheel to which the valve-rod is connected, would be the equivalent of the adjustable eccentric shown and described.

The rod G′ of the cut-off eccentric G is connected to a pin, *h′*, on the lower arm, $H^1$, of a rock-shaft, H, in or about in line with the fulcrum of the rocker F of the main valve. The rock-shaft H is journaled in said rocker F about midway between the fulcrum and free end, and carries an upper arm, $H^2$, of corresponding length to its lower arm, $H^1$. The rod $D^1$ of the cut-off valve D passes through the tubular rod $C^1$ of the main valve, which is provided at its outer end with a stuffing-box, $c^1$, and a link, $D^2$, couples the rod $D^1$ with a pin, $h^2$, on the upper arm, $H^2$, of the cut-off rock-shaft H.

By the construction and combination of parts described and shown, it will be seen that the functions of admission and exhaust are performed by the main valve, without interference with or modification by the operation of the separate cut-off valve; and the movement of the latter for each stroke of the piston, while subject to be varied by the governor, as required, to change the point of cut-off in correspondence with changes of steam-pressure and resistance of load, is, by reason of the relation of its rocker to that of the main valve, the same relatively to its seat upon the moving main valve, both as to duration and extent, as would be produced if it (the cut-off valve) worked upon a stationary seat and was connected directly to its eccentric. The advantages in approximating perfect automatic regulation, which I obtain by the suppression of such stationary seat and the location of the cut-off valve at the nearest practicable point to the cylinder-ports, will be apparent to those skilled in the art of steam-engine construction.

I am aware that the employment of an eccentric adjusted upon its shaft by a centrifugal governor rotating thereon, to vary the point of cut-off, has been heretofore known, an instance of which may be found in the patent of J. D. Custer, No. 1,179, dated June 21, 1839, and I do not, therefore, broadly claim such device.

I claim as my invention and desire to secure by Letters Patent—

The combination, in a steam-engine, of a main valve, substantially as described, operated by a fixed eccentric; a separate cut-off valve, having its seat in said main valve, and operated by an adjustable eccentric, which is varied in position upon its shaft by a governor thereon; a rocker-arm, which is pivoted at one end to a bearing, and connected at the other to the valve and eccentric-rods of the main valve; and a double-armed rock-shaft, journaled in said rocker-arm, and having its arms connected, respectively, to the valve and eccentric rods of the cut-off valve, substantially as set forth.

JOSEPH W. THOMPSON.

Witnesses:

THOMAS KENNETT,
PETER AMBLER.